March 15, 1955     E. E. ACHBERGER     2,703,919

ROLLER FOR DETACHABLY CARRYING PAINT APPLYING COVERS

Filed Jan. 4, 1952

INVENTOR.
ELDON E. ACHBERGER
BY John W. Michael
ATTORNEY

United States Patent Office 2,703,919
Patented Mar. 15, 1955

2,703,919

ROLLER FOR DETACHABLY CARRYING PAINT APPLYING COVERS

Eldon E. Achberger, Milwaukee, Wis., assignor to Bestt Rollr Inc., a corporation of Wisconsin Application January 4, 1952, Serial No. 265,011

1 Claim. (Cl. 29—116)

This invention relates to improvements in rollers, particularly of the type on which is removably fitted a tube-like cover for applying paints or the like.

Covers for rollers of this type usually have an internal cylinder made of cardboard, plastic, wire screening, fibre tubing, or a variety of other materials to provide a smooth support for the outer covering. Some covers will readily collapse and must be supported throughout practically the entire circumference, others are sufficiently rigid to be self supporting. In either event the covers must be frictionally held on the roller so that they will not slide off during operation and yet the friction supplying means should not be so tight as to prevent ready removal of the cover.

Attempts to provide such frictional means by the inherent elasticity of the wall of the roller have proven inadequate. The roller must be light in weight. Hence, thin gauge light weight metal walls such as aluminum are practical, but such material does not have lasting resilience and the inherently produced resilience is quickly lost and the cover will not longer be held in place in operation. Another disadvantage of this type or roller is that engagement between the roller wall and the internal cylinder of the covering takes place only over a narrow area along the longitudinally extending edge of the slot or slots in the roller wall. Such small surface contact is not sufficient to hold the covering in place. A further disadvantage is that such type of roller forces the covering out of true cylindrical shape and causes uneven rolling and paint distribution.

One object of this invention therefore is to provide a roller which will frictionally engage a tubular covering to hold it in place during use and permit its easy removal, which roller is free of the faults set forth above.

Another object of this invention is to provide a roller which is easily disassembled to replace damaged or worn parts or to clean such parts.

A further object is to provide a roller which will freely rotate on its mounting axle while lessening to an unappreciable amount the occurrence of black streaks in the applied paint.

A still further object of this invention is to provide a roller which is easily and cheaply made and assembled by mass production techniques.

These objects are obtained by utilizing a roller body consisting of two oppositely positioned hollow substantial half-cylinders made of thin light weight metal held in shape by internal beads. These half-cylinders are resiliently urged apart by internal metal springs and held from separating beyond a substantial whole cylinder shape by engagement with overlapping end caps. The end caps have synthetic bushings riding on the supporting axle. The roller may be slid axially on or off the supporting axle on which it is rotatively held by a screw or other fastening. To disassemble the roller it is only necessary to slide off the end caps thus permitting the two half-cylinders to separate. The internal springs may, for convenience of assembly, be secured to one of the half-cylinders.

Because of the retained cylindrical shape of the half-cylinders their outer surface will engage the inner surface of the cover throughout their respective co-extensive areas thus providing a large friction area sufficient to retain the covering in place and yet requiring comparatively little pressure from the internal springs. Thus the cover is easily removed and replaced. The springs are made of spring metal and will retain their resilience over a long time. Because the metal from which the two half-cylinders are made does not supply any of the spring force necessary to create the cover retaining friction, light weight metal such as aluminum alloy may be used.

It has been found that the use of a synthetic bushing in the end caps reduces to an unappreciable amount the presence of black streaks in the applied paint. In addition the roller operates more quietly.

Most of the parts comprising the roller may be made on mass production dies, on presses or the like and quickly assembled in jigs to cut down the cost of manufacture.

The novel features which are considered characteristic of the invention are set forth with particularity in the appended claim. The invention itself, however, both as to its organization and its method of operation, together with additional objects and advantages thereof, will best be understood from the following description of a specific embodiment when read in connection with the accompanying drawing in which:

Figure 1:
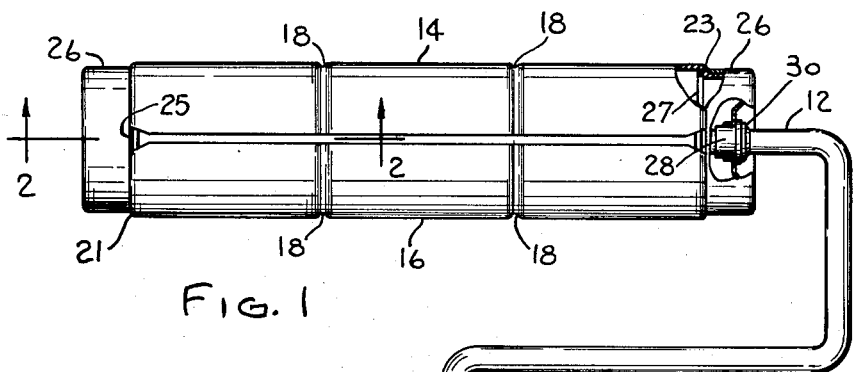
Fig. 1 is a view in side elevation of a roller embodying the present invention, part being broken away and shown in section for clarity of illustration.

The roller shown in the drawing provides the support for a cover for applying paint or the like. The design of such cover is well known to those skilled in this art and for that reason is not shown. For the purpose of understanding the operation of the roller herein described, it is only necessary to know that such cover has internal diameter slightly greater than the external diameter of the end caps and slightly less than the external diameter of the roller when freely expanded.

The roller embodying this invention is mounted on a supporting handle 10 having an axle 12. The main body of the roller consists of two substantial half-cylinders 14 and 16 oppositely mounted to substantially form a hollow cylinder. These half-cylinders are not true half-cylinders, being a little less (3/32") than half a circle in circumference so that when oppositely mounted as shown their edges will be slightly spaced when in cylindrical relationship. The half-cylinders 14 and 16 are of identical construction with the exception of the spring holding tabs hereinafter described in detail. It is preferable to form the half-cylinders from light weight, thin gauge sheet material which is inert to the action of paints. Aluminum alloy has been found satisfactory although there are many other kinds of material. In the fabrication of the half-cylinders, it has been found essential to form therein internal beads 18 which stiffen the material when formed to retain the true cylindrical shape imparted thereto. If such beads or other reinforcing folds were not formed in the half-cylinders, such cylinders would spread after being shaped and lose the cylindrical outer surface which is important in supporting and engaging the cover. At each end of the half-cylinders there is a reduced neck 20 having an outer diameter small enough to provide for the thickness of the end caps and have the outer diameter of the main body of the roller, when uncompressed, larger than the outer diameter of the end caps. At the juncture of the reduced necks 20 with main body of the half-cylinders there are formed internal shoulders 21 and 23 which are used as a spring guide.

Figures 2, 3:
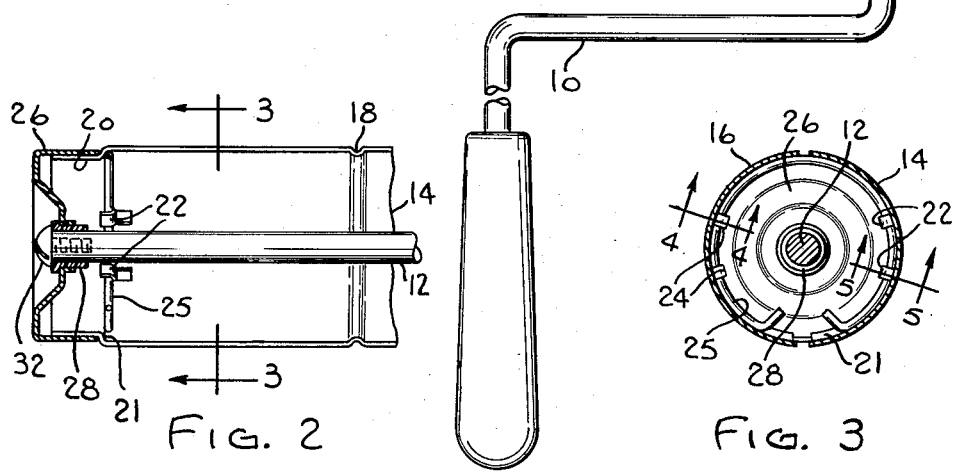
Fig. 2 is an enlarged fragmentary sectional view taken on the line 2—2 of Fig. 1.
Fig. 3 is a sectional view taken on the line 3—3 of Fig. 2.
Figures 4, 5:
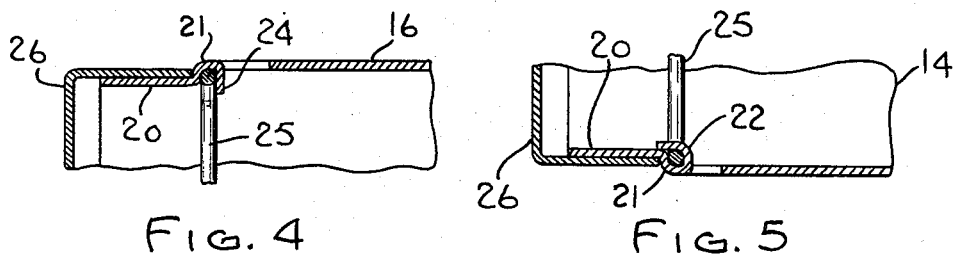
Fig. 4 is an enlarged fragmentary sectional view taken on the line 4—4 of Fig. 3.
Fig. 5 is an enlarged fragmentary sectional view taken on line 5—5 of Fig. 3.

The half-cylinders 14 and 16 are continually urged apart by the two single coil C-type springs 25 and 27 located within the roller adjacent the internal shoulders 21 and 23 by which such springs are held as shown. These springs are made of spring steel and have their ends bent inwardly as shown in Fig. 3 to prevent the edges of such ends from digging into surface of the half-cylinders. It is preferable to first assemble and lock the springs within the half-cylinder 14 by tabs 22 struck inwardly from such half-cylinder and curled over the springs 25 and 27 in the direction of the internal shoulders. Tabs 24 are also struck inwardly from the half-cylinder 16 but such tabs are not curled over. Instead these tabs remain normal to the surface of such half-cylinder and permit the springs 25 and 27 to be inserted between such internal shoulder and the straight tabs 24.

End caps 26 are fitted over the reduced necks 20 and are frictionally held in place by the force created by the springs 25 and 27. The end caps 26 have centrally located bushings 28 rotatable on the axle 12. It has been found practical to make such bushings from synthetic material inert to the action of paints. Any number of commercial plastics have been found suitable for such purpose. The bushings 28 are pressed into place so as to be fixed with respect to the end caps 26. Experiments have shown that the use of synthetic material for the bushings lessens the presence of black streaks in paint applied by rollers. It is believed that the wearing engagement between metal bushing and metal axle contributes materially to the presence of black streaks in paint application. At any event the presence of such black streaks has been reduced to an imperceptible amount by using synthetic bushings.

Before the roller is slid on the axle 12, a collar 30 is rigidly mounted on such axle 12 to provide an abutment for the right end of the roller. The roller assembly is then slid on the axle 12 and a retaining screw 32 threaded into end of such axle to hold the roller in place. The screw 32 and collar 30 abut against the outer ends of the bushings 28 and keep the end caps 26 in place on the reduced necks 20.

As a cover is slid onto the roller, the two half-cylinders 14 and 16 will be forced together slightly compressing the springs 25 and 27. Because each half-cylinder retains its initial cylindrical shape even when the roller is so compressed by a cover, there will be full surface area engagement between each half-cylinder and the inner surface of the covering. This provides a large area for establishing sufficient friction to retain the cover in place without the necessity of heavy spring tension. Because of this the covers will always be kept in true cylindrical shape and may be readily removed and easily replaced. If it is desired to separately clean the parts of the roller assembly or to replace worn parts, such as an end cap, it is only necessary to take out screw 32. The roller assembly will slide from the axle 12 and the end caps 26 can easily be removed from the reduced necks 20 to disassemble the half-cylinders 14 and 16.

Although only one embodiment of the invention is shown and described herein, it will be understood that this application is intended to cover such changes or modifications as come within the spirit of the invention or scope of the following claim.

I claim:

A roller for removably mounting a cover comprising, a pair of oppositely related hollow substantial half-cylinders, spring means carried within and reacting directly between said half-cylinders for resiliently urging said half-cylinders apart, end caps slidable longitudinally of said half-cylinders and fitted over the ends of said half-cylinders to restrain said half-cylinders from being moved apart by said means, a supporting axle, and bushings for rotatively supporting said end caps on said axle, said bushings being press fitted into said end caps and riding on said axle and made of synthetic material inert to paint to lessen the chance of black streaks in paint applied by said roller, said half-cylinders being movable toward each other to frictionally receive and hold a cover thereon.

References Cited in the file of this patent

UNITED STATES PATENTS

| | | |
|---|---|---|
| 1,036,671 | McDevitt | Aug. 27, 1912 |
| 1,210,401 | Bergstrom | Jan. 2, 1917 |
| 1,722,301 | Kavle | July 30, 1929 |
| 2,461,413 | Dirand | Feb. 8, 1949 |
| 2,647,299 | Thomas | Aug. 4, 1953 |

FOREIGN PATENTS

| | | |
|---|---|---|
| 530,480 | Great Britain | Dec. 12, 1940 |